US010845179B2

(12) United States Patent
Batt et al.

(10) Patent No.: US 10,845,179 B2
(45) Date of Patent: Nov. 24, 2020

(54) GAUGE TOOL FOR DETERMINING BLIND FASTENER LENGTH

(71) Applicant: The Boeing Company, Chicago, IL (US)

(72) Inventors: Edward J. Batt, Mount Pleasant, SC (US); Jamie E. Bigley, Mount Pleasant, SC (US); Mary C. Heath, Summerville, SC (US); Andrew Michael Huckey, Charleston, SC (US); Bernard K. Manderville, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 16/173,547

(22) Filed: Oct. 29, 2018

(65) Prior Publication Data

US 2020/0132426 A1    Apr. 30, 2020

(51) Int. Cl.
*G01B 3/28* (2006.01)
(52) U.S. Cl.
CPC ..................................... *G01B 3/28* (2013.01)
(58) Field of Classification Search
CPC ........................................................ G01B 3/28
USPC ................................................... 33/542, 836
See application file for complete search history.

(56) References Cited

U.S. PATENT DOCUMENTS

| 4,216,585 | A | * | 8/1980 | Hatter | ...................... | G01B 5/18 |
| | | | | | | 33/836 |
| 2006/0090363 | A1 | * | 5/2006 | Luner | ...................... | G01B 3/28 |
| | | | | | | 33/833 |
| 2012/0213610 | A1 | * | 8/2012 | Guerin | .................. | F16B 35/044 |
| | | | | | | 411/361 |
| 2013/0298414 | A1 | * | 11/2013 | Zhang | ...................... | G01B 5/18 |
| | | | | | | 33/502 |
| 2015/0275953 | A1 | * | 10/2015 | Gunther | .................. | B23P 25/00 |
| | | | | | | 29/418 |
| 2018/0043440 | A1 | * | 2/2018 | Nestleroad | ............... | B25H 7/02 |

* cited by examiner

*Primary Examiner* — George B Bennett
(74) *Attorney, Agent, or Firm* — Duft & Bornsen, PC

(57) ABSTRACT

Embodiments herein provide determining blind fastener length. One embodiment is a gauge tool that includes a base plate, and a nose piece including a hollow cylindrical member extending through the base plate and an expandable tip configured to radially expand to circumferentially contact a back rim of a hole. The nose piece is configured to slide with respect to the base plate to retract into the base plate until stopped by the expandable tip pressing the back rim of the hole. The gauge tool further includes a measurement device configured to detect a translating distance of a slidable member moving with retraction of the nose piece, and to display the translating distance for determining a fastener length for the hole.

20 Claims, 6 Drawing Sheets

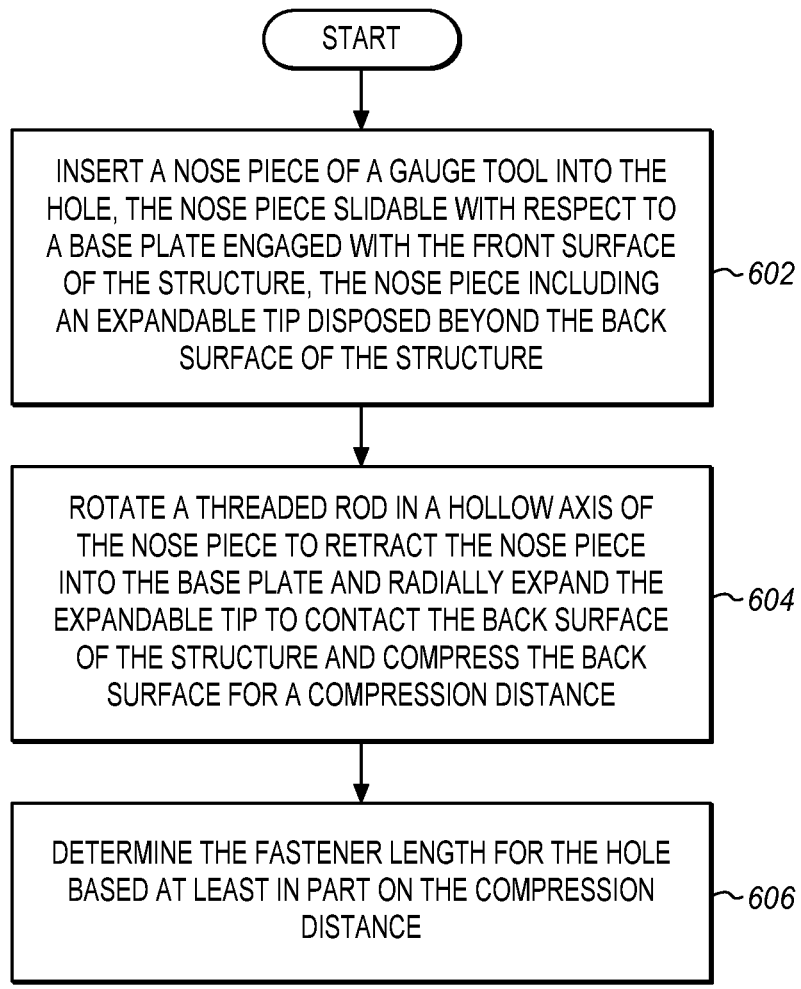

GAUGE TOOL FOR DETERMINING BLIND FASTENER LENGTH

FIELD

This disclosure relates to assembly of structures, and more particularly, to measuring a thickness of material where a blind fastener is to be installed.

BACKGROUND

Blind fasteners, such as blind bolts or blind rivets, are used in aircraft assembly to mechanically unite various structural components of an aircraft. Unlike nut bolts which require access to both sides of the structure, blind fasteners can be completely installed with the structure where there is no access to the back side. Accordingly, before installing a blind fastener to a hole, an aircraft technician measures the length of the hole (i.e., the thickness of the structure) using a grip selection gauge that includes a hook which is inserted into the hole and a handle which is squeezed by the technician to clamp the hook to the hole against the front and back sides of the structure. Thus, the grip selection gauge is able to measure the material thickness of the structure and therefore determine (i.e., select) the overall length of the fastener that should be used for the hole.

In modern aircraft structures, such as carbon fiber reinforced plastic (CFRP) structures, the back side of a joint stack may include an epoxy bonded honeycomb core. The epoxy used for bonding the honeycomb to the core material may create a wavy, convoluted surface on the back side of the hole. Therefore, to accurately measure the thickness of such a material with an existing grip selection gauge, the aircraft technician measures the hole 2-3 times to obtain an accurate calculation of the hole length for determining the correct fastener grip size. This means that the grip selection gauge is repositioned and its handle squeezed by the operator 2-3 times for each hole. Since an aircraft section may include hundreds of holes to be measured for blind fastener installation, existing grip selection gauges are ergonomically burdensome and labor intensive.

SUMMARY

Embodiments described herein utilize an enhanced gauge tool for installing blind fasteners. The gauge tool is configured to compress the wavy back side surface of the hole (e.g., due to the epoxy used for bonding) to perform the measurement over an even surface. This improves the quality of the measurement, thereby increasing accuracy in fastener grip selection and reducing rework from incorrect fastener installation. Additionally, the gauge tool eliminates the need to make multiple measurements per hole and does not require a squeezing motion by the operator, thereby improving assembly time and ergonomic conditions.

One embodiment is a gauge tool that includes a base plate having a front side and a back side, and a nose piece including a hollow cylindrical member extending through the base plate from a connected end to a distal end. The connected end is coupled with a slidable member at the back side of the base plate. The distal end protrudes a first distance from the base plate at the front side of the base plate and includes an expandable tip. The expandable tip is configured to radially expand to circumferentially contact a back rim of a hole. The nose piece is configured to slide with respect to the base plate to retract into the base plate until the distal end is disposed a second distance from the base plate due to the expandable tip pressing the back rim of the hole. The gauge tool further includes a measurement device configured to detect a translating distance of the slidable member moving with retraction of the nose piece from the first distance to the second distance, and to display the translating distance for determining a fastener length for the hole.

Another embodiment is a method of determining a fastener length for a hole extending between a front surface and back surface of a structure. The method includes providing a gauge tool including a base plate and a nose piece slidable with respect to a base plate, and inserting the nose piece of the gauge tool into the hole, the nose piece including an expandable tip disposed beyond the back surface of the structure. The method further includes rotating a threaded rod in a hollow axis of the nose piece to retract the nose piece into the base plate and radially expand the expandable tip to contact the back surface of the structure and compress the back surface for a compression distance. The method also includes determining the fastener length for the hole based at least in part on the compression distance.

Yet another embodiment is a gauge tool for determining a fastener length for a hole extending between a front surface and back surface of a structure. The gauge tool includes a base plate having a front side to engage the front surface of the structure over the hole, and a nose piece extending from the front side of the base plate. The nose piece is slidable with respect to the base plate and includes: a first end with an expandable tip sized to insert into the hole beyond the back surface of the structure, a second end that is mechanically coupled with a slidable member disposed at a back side of the base plate, and a hollow axis along a length of the nose piece. The gauge tool further includes a threaded rod to rotate in the hollow axis of the nose piece to retract the nose piece into the base plate and expand the expandable tip to contact the back surface of the structure and compress the back surface for a compression distance, wherein retraction of the nose piece translates the slidable member for a distance that includes the compression distance. The gauge tool further includes a measurement device configured to detect the distance that the slidable member translates as a result of rotating the threaded rod for determining the fastener length for the hole.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIG. 6 is a flow chart illustrating a method of determining a fastener length for a hole extending between a front surface and back surface of a structure in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
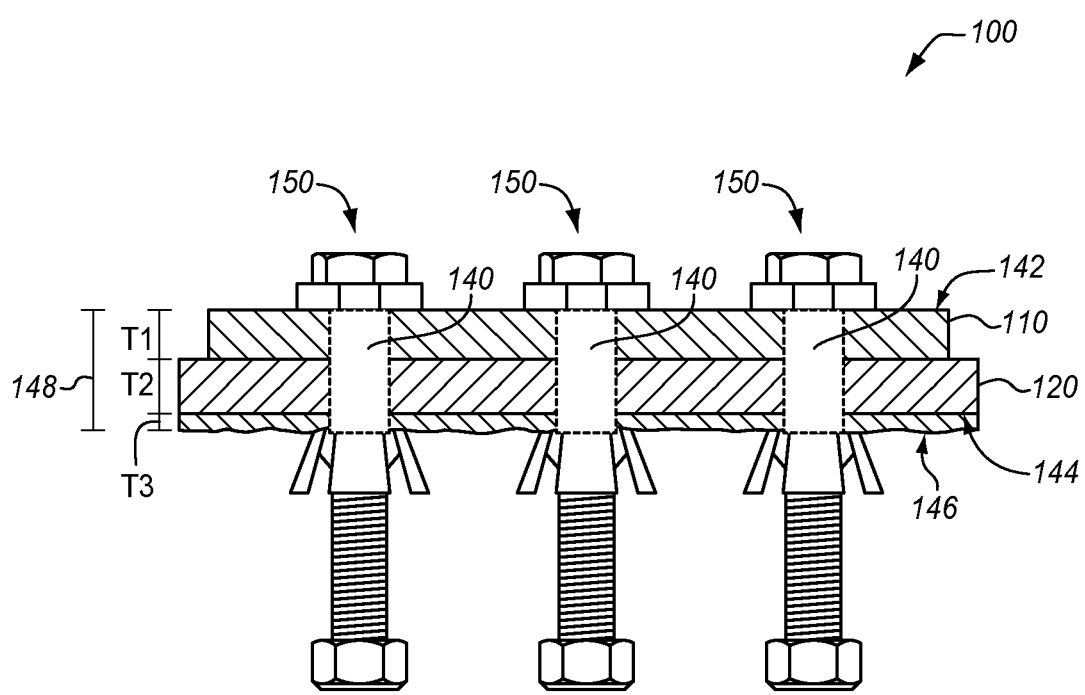
FIG. 1 illustrates a structure including a first structural component and a second structural component assembled together with blind fasteners.

FIG. 1 illustrates a structure 100 including a first structural component 110 and a second structural component 120 assembled together with blind fasteners 150. Generally, the first structural component 110 and the second structural component 120 are stacked together and include holes 140 which are aligned/drilled such that the holes 140 extend between a front surface 142 and back surface 144 of the structure 100. The blind fasteners 150 are installed with the holes 140 to secure the first structural component 110 and the second structural component 120 together and assemble the structure 100.

In general, the blind fasteners 150 are installed in situations where a technician can see/access the front surface 142 of the structure 100 but cannot see or easily access the back surface 144 of the structure 100. For example, the second structural component 120 may include a barrel, tube, or ring-shaped body with an inner wall (i.e., back surface 144) which cannot be reached with a hand and/or power tool. One or more of the holes 140 may therefore comprise blind side holes. Additionally, the second structural component 120 may, for example, include an epoxy bonded honeycomb core back side. Thus, the back surface 144 of the structure 100 may include an uneven surface 146 that is wavy or convoluted due to the epoxy used for bonding.

Before installing the blind fasteners 150 to the holes 140, the aircraft technician determines a maximum total thickness 148 of the structure 100 at each of the holes 140 to ensure that a fastener with the correct grip length is selected for the hole 140. In this example, the maximum total thickness 148 includes a first thickness T1 of the first structural component 110, a second thickness T2 of the second structural component 120, and a third thickness T3 of the uneven surface 146 which may include an epoxy layer or surface that varies across the back surface 144 of the structure 100. The maximum total thickness 148 between the front surface 142 and the back surface 144 may therefore vary among the holes 140 due to the uneven surface 146.

For tight tolerance applications such as aircraft assembly, the technician may use a gauge tool to accurately measure the maximum total thickness 148 in each hole 140, taking into account the variable third thickness T3 for each hole 140, to determine the precise grip length (and therefore select the correct type/size of blind fastener 150 to use) for each hole 140. This ensures that the grip length of the blind fastener 150 isn't too long for the hole 140 (potentially resulting in a loose fastener connection) or too short for the hole 140 (potentially resulting in incorrect fastener setting or compromised strength of the structure 100).

Unfortunately, existing hook-type gauge tools are especially difficult to use in circumstances in which the back surface 144 of the structure 100 includes the uneven surface 146 as described above. Generally, the operator inserts the hook into the hole 140 and squeezes the handle to draw the hook to the back surface 144 to clamp the hole 140 and take the measurement of the clamped material. However, since the back surface 144 includes the uneven surface 146 (e.g., uneven dried epoxy around the back rim of the hole 140 which cannot be seen or accessed), the operator typically positions and clamps the hook multiple times for each hole 140 to ensure that the maximum total thickness 148 of the hole 140 is accurately captured. This makes the process of determining fastener lengths for the holes burdensome.

Figure 2:
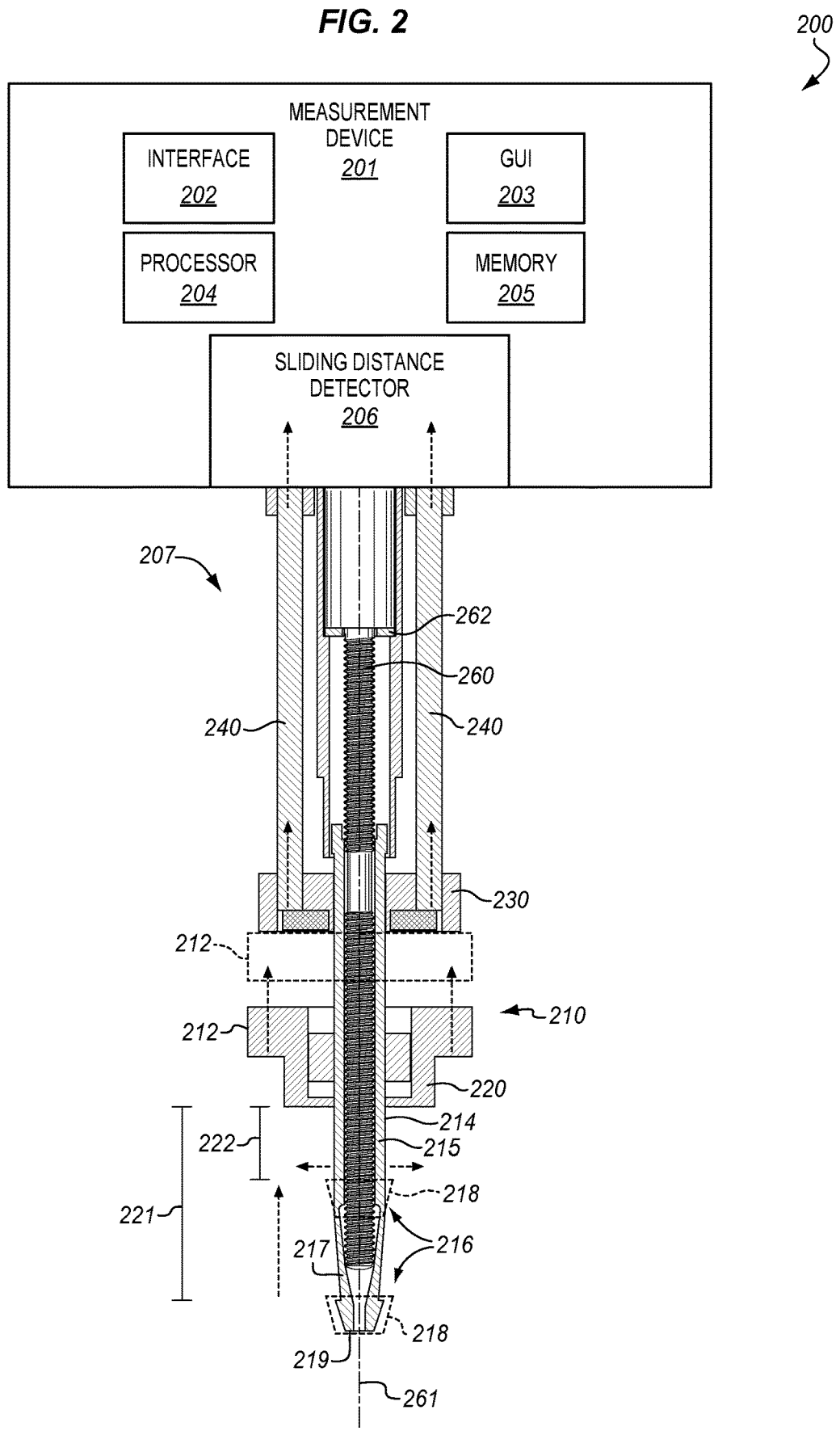
FIG. 2 is a schematic view of a gauge tool with enhanced fastener length determination in an illustrative embodiment.

FIG. 2 is a schematic view of a gauge tool 200 with enhanced fastener length determination in an illustrative embodiment. The gauge tool 200 includes a measurement device 201 coupled with a mechanical structure 207 to accurately and quickly measure a blind side hole having an uneven, epoxy-bonded blind surface. In particular, the mechanical structure 207 includes a nose piece 210 configured to slide with respect to a base plate 220. The nose piece 210 includes a connected end 212, a cylindrical member 214, and a distal end 216. The connected end 212 is configured to couple with a transfer block 230 to link the sliding motion of the nose piece 210 with the transfer block 230 and one or more sliding members 240. The connected end 212 abuts the back side of the base plate 220 to stop the nose piece 210 in a fully extended position (e.g., reference position). With the nose piece 210 in the fully extended position, the distal end 216 extends from the base plate 220 for a first distance 221 between the front side of the base plate 220 and an expandable tip 218 of the distal end 216.

The mechanical structure 207 further includes a threaded rod 260 extending along an axis 261 through one or more tubular members 262. The threaded rod 260 also extends through at least a portion of the nose piece 210. As shown in FIG. 2, with the nose piece 210 in the fully extended position, the threaded rod 260 extends into an inner threaded wall 215 of the cylindrical member 214 of the nose piece 210. Accordingly, with the threaded rod 260 driven to rotate about the axis 261, the nose piece 210 retracts a distance as indicated by the dotted arrows. As the nose piece 210 retracts into the base plate 220, the connected end 212 of the nose piece 210 presses and translates the transfer block 230 and the sliding members 240 for a corresponding distance as also indicated by the dotted arrows.

The retraction of the nose piece 210 and rotation of the threaded rod 260 further causes the threaded rod 260 to extend through a tapered throat 217 and opening 219 of the nose piece 210. The nose piece 210 thus retracts axially along the axis 216 as its distal end 216 expands radially outward from the axis 216 as a result of rotating the threaded rod 260. In particular, the expandable tip 218 of the nose piece 210 is configured to radially expand from a first circumference smaller than the circumference of the hole 140 (e.g., to fit the distal end 216 through the hole) to a second circumference larger than the circumference of the hole 140 (e.g., to contact the back rim of the hole 140). In other words, the expandable tip 218 forms a compression surface parallel with the face of the base plate 220 to compress the structure 100 therebetween. And, the expandable tip 218 moves radially outward such that its compression surface presses perpendicularly into the uneven surface 146 and contacts/compresses the uneven surface 146 circumferentially around the rim of the hole 140 for measuring the hole 140.

The nose piece 210 retracts until the expandable tip 218 is forced against an opposing surface (e.g., back surface 144 of the hole 140). The torque of the threaded rod 260 defines the retraction force of the expandable tip 218 against the opposing surface. Therefore, the torque of the threaded rod 260 may define a compression force/distance of the expandable tip 218 into epoxy at the back rim of the hole 140. The nose piece 210 thus translates for a distance that includes a compression distance of the expandable tip 218 into its opposing surface, until the opposing force exceeds the torque force and retraction of the nose piece 210 is stopped.

With the nose piece 210 in the stopped, retracted position, the distal end 216 extends from the base plate 220 for a second distance 222 between the front side of the base plate 220 and the expandable tip 218, which is shorter than the first distance 221 described above. The second distance 222 defines a length/thickness of the hole 140 where the back rim of the hole 140 is flattened/crushed for taking the measurement of the hole 140. The measurement device 201 may determine/calculate the second distance 222 based on the first distance 221 and the movement distance of the nose piece 210 and the sliding members 240.

In one embodiment, the measurement device 201 includes an interface 202, a graphical user interface (GUI) 203, a processor 204, memory 205, and a sliding distance detector 206. The sliding distance detector 206 interfaces one or more of the sliding members 240 to detect the total retraction distance of the nose piece 210. The retraction distance may be stored in memory 205 for processing. The processor 204 includes any electronic circuits and/or optical circuits that are able to perform functions. The processor 204 may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel® Core™ processors, Advanced Reduced Instruction Set Computing (RISC) Machines (ARM®) processors, etc.

The memory 205 includes any electronic circuits, optical circuits, and/or magnetic circuits that are able to store data. Data related to dimensions of components of the mechanical structure 207 attached to the measurement device 201 may be stored in memory 205 for determining/selecting a fastener grip length. For example, a reference position/length of the nose piece 210 (e.g., first distance 221) may be stored in memory 205 to enable the processor 204 to determine an overall hole length (e.g., second distance 222) by subtracting the detected retraction length from the reference length. Alternatively or additionally, memory 205 may store a mapping that correlates a calculated/measured structure thickness (e.g., second distance 222) to one or more lengths/types of blind fasteners (e.g., blind bolts) to install to the structure. The calculated/measured hole length, or selected fastener grip length corresponding thereto, may be displayed on the GUI 203. Alternatively or additionally, the calculated/measured hole length, or selected fastener grip length corresponding thereto, may be exchanged via the interface 202 over one or more wired or wireless connections.

Figure 3:
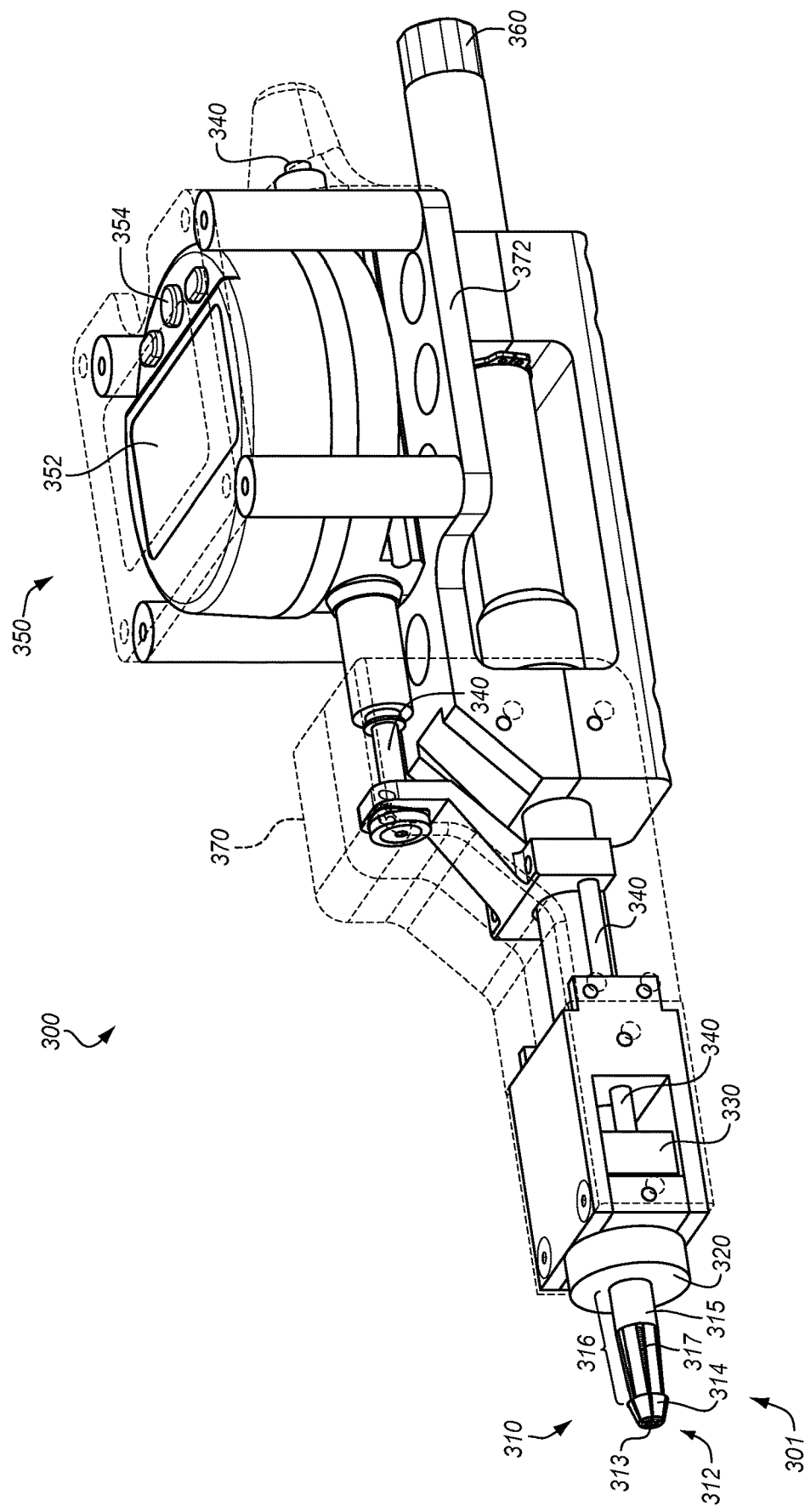
FIG. 3 is a perspective view of the gauge tool deployed in a pre-measurement position in an illustrative embodiment.
Figure 4:
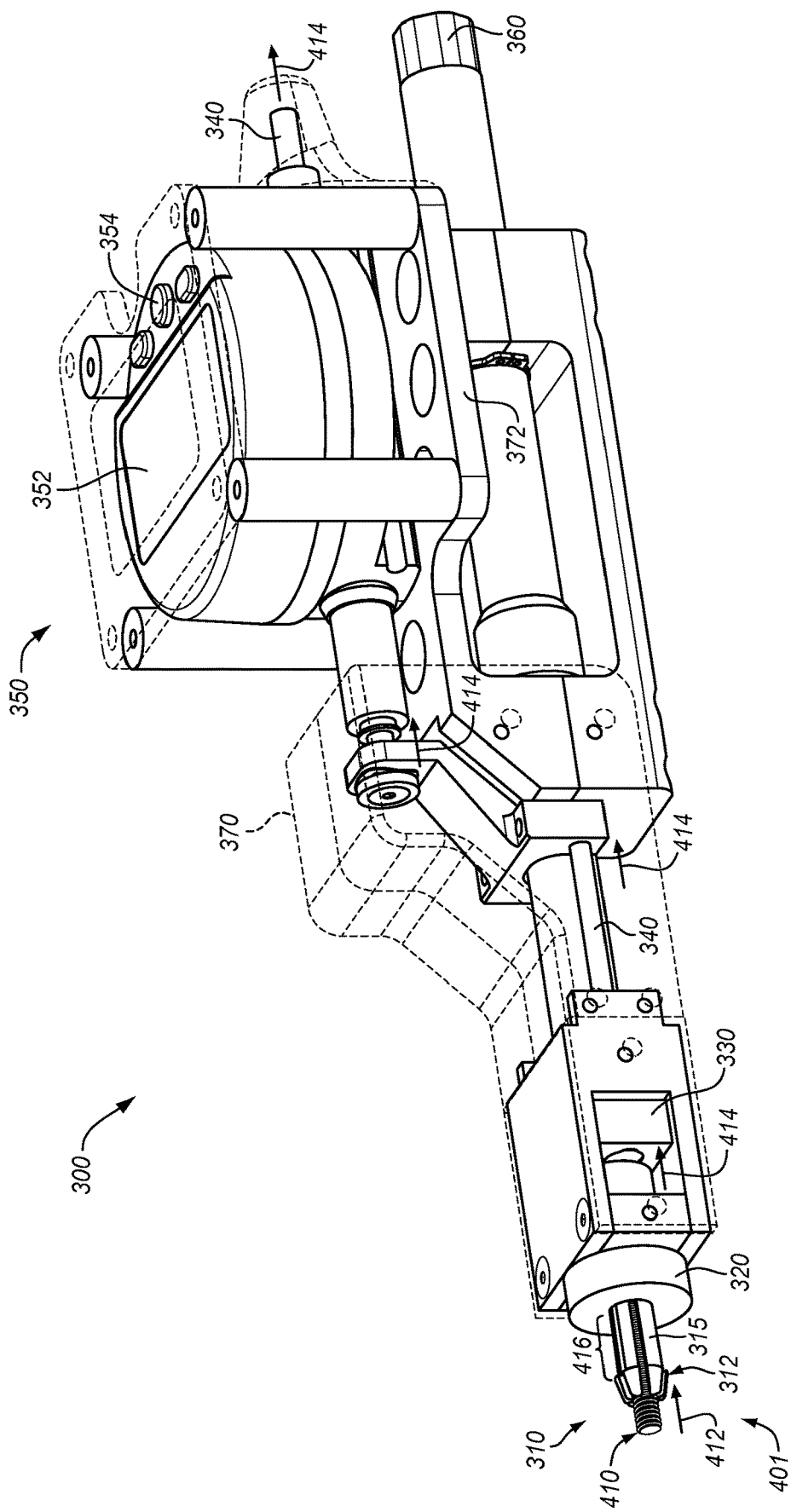
FIG. 4 is a perspective view the gauge tool deployed in a measurement position an illustrative embodiment.

FIGS. 3-4 illustrate a gauge tool 300 with enhanced fastener length determination in illustrative embodiments. FIG. 3 is a perspective view of the gauge tool 300 deployed in a pre-measurement position 301 in an illustrative embodiment. FIG. 4 is a perspective view of the gauge tool 300 deployed in a measurement position 401 in an illustrative embodiment. The gauge tool 300 is described with respect to the structure 100 of FIG. 2, though it will be appreciated that features of the gauge tool 300 may similarly apply to alternative structures. The gauge tool 300 includes a nose piece 310, a base plate 320, a transfer block 330, one or more transfer rods 340, and a measurement device 350. The gauge tool 300 also includes a drive 360 and a threaded rod 410 (shown in FIG. 4).

Generally, the gauge tool 300 is configured to measure a hole 140 by positioning the nose piece 310 through the hole 140 with the gauge tool 300 in the pre-measurement position 301 shown in FIG. 3, and retracting/expanding the nose piece 310 to the measurement position 401 shown in FIG. 4 to grip the hole 140 between the base plate 320 and an expandable tip 312 of the nose piece 310. The nose piece 310 retracts into the base plate 320 and expands the expandable tip 312 of the nose piece 310 via the rotating action of the threaded rod 410, which in turn is rotated via the drive 360. The drive 360 forms a non-circular indentation to receive a rotational tool (e.g., power drill), and transfers rotation of the rotational tool to the threaded rod 410.

The nose piece 310 is mechanically coupled with one or more slidable members that translate with the retracting movement of the nose piece 310. In this embodiment, the nose piece 310 is coupled with the transfer block 330, and the transfer block 330 is coupled with a series of transfer rods 340. Thus, as the nose piece 310 retracts a retraction distance 412, the transfer block 330 and the transfer rods 340 translate a corresponding distance 414 (see FIG. 4). At least one of the transfer rods 340 translates in and/or with respect to the measurement device 350, which is any device configured to detect/measure a distance of movement of a translating member. Accordingly, the measurement device 350 is configured to measure a thickness of the hole 140 based on a detected retraction distance 414 of the nose piece 310.

The gauge tool 300 provides a technical benefit in that the back surface 144 of the structure 100 (e.g., the rim of the hole 140 at the blind side) is gripped and measured in a single measurement action without the repetitive hand squeezing action of prior hook-type gauges. Moreover, the gauge tool 300 advantageously is configured to compress the uneven surface 146 (e.g., epoxy on the back surface 144) with a consistently applied force to accurately measure the hole 140 and precisely select the correct fastener length. For example, the rotational tool may be configured with a predetermined torque (e.g., torque setting, level, or value) that applies a corresponding prescribed force and compression distance of the expandable tip 312 into the back surface 144 of the structure 100. The uneven surface 146 is therefore flattened for a compression distance to eliminate any unevenness at the back surface 144 (e.g., blind side) of the hole 140 to precisely measure a stack thickness of the holes 140 and prepare the holes 140 for installing blind fasteners in a consistent manner.

The measurement device 350 includes a display 352 to indicate the measured motion of the nose piece 310, and one or more buttons 354 to receive input from the operator. Alternatively or additionally, the measurement device 350 may include circuitry (e.g., a processor, memory, etc.) to calculate a thickness of the hole 140 and/or a determined fastener length based on the measured motion of the nose piece 310. For example, with information of the length of the nose piece 310 fully extended from the base plate 320, the measurement device 350 may calculate the thickness of the hole 140 by measuring the distance of translation of the nose piece 310 from the fully extended position to a position engaged with the back surface 144 including the distance of compression into the uneven surface 146.

As shown in FIG. 3, the expandable tip 312 of the nose piece 310 includes an opening 313, and a head shoulder 314 to expand and grip the hole 140. Additionally, the nose body 315 includes a hollow body extending for a first extension length 316 from the base plate 320 to the head shoulder 314 with the nose piece 310 in the fully extended position. The nose body 315 also includes slits 317 extending down at least a portion of its length to the opening 313. Therefore, the nose piece 310 is configured to deform outwardly as the threaded rod 410 (shown in FIG. 4) presses through the opening 313 and expands the head shoulder 314 beyond the dimension of the hole 140. With the nose piece 310 engaged with the uneven surface 146, the nose body 315 extends from the base plate 320 to the head shoulder 314 for a second extension length 416 (shorter than the first extension length 316) which defines the grip measurement of the hole 140 detected/determined by the measurement device 350.

The gauge tool 300 also includes one or more housing elements 370 and structural frame members 372. For example, one or more housing elements 370 enclose the slidable members (e.g., the transfer block 330 and transfer rods 340) disposed between the base plate 320 and the measurement device 350. The structural frame members 372 provide a structure that holds stationary components (e.g., the base plate 320 and the measurement device 350) in place with respect to one another to enable measuring the relative movement of the translating components (e.g., the nose piece 310, the transfer block 330, and the transfer rods 340).

Figure 5:
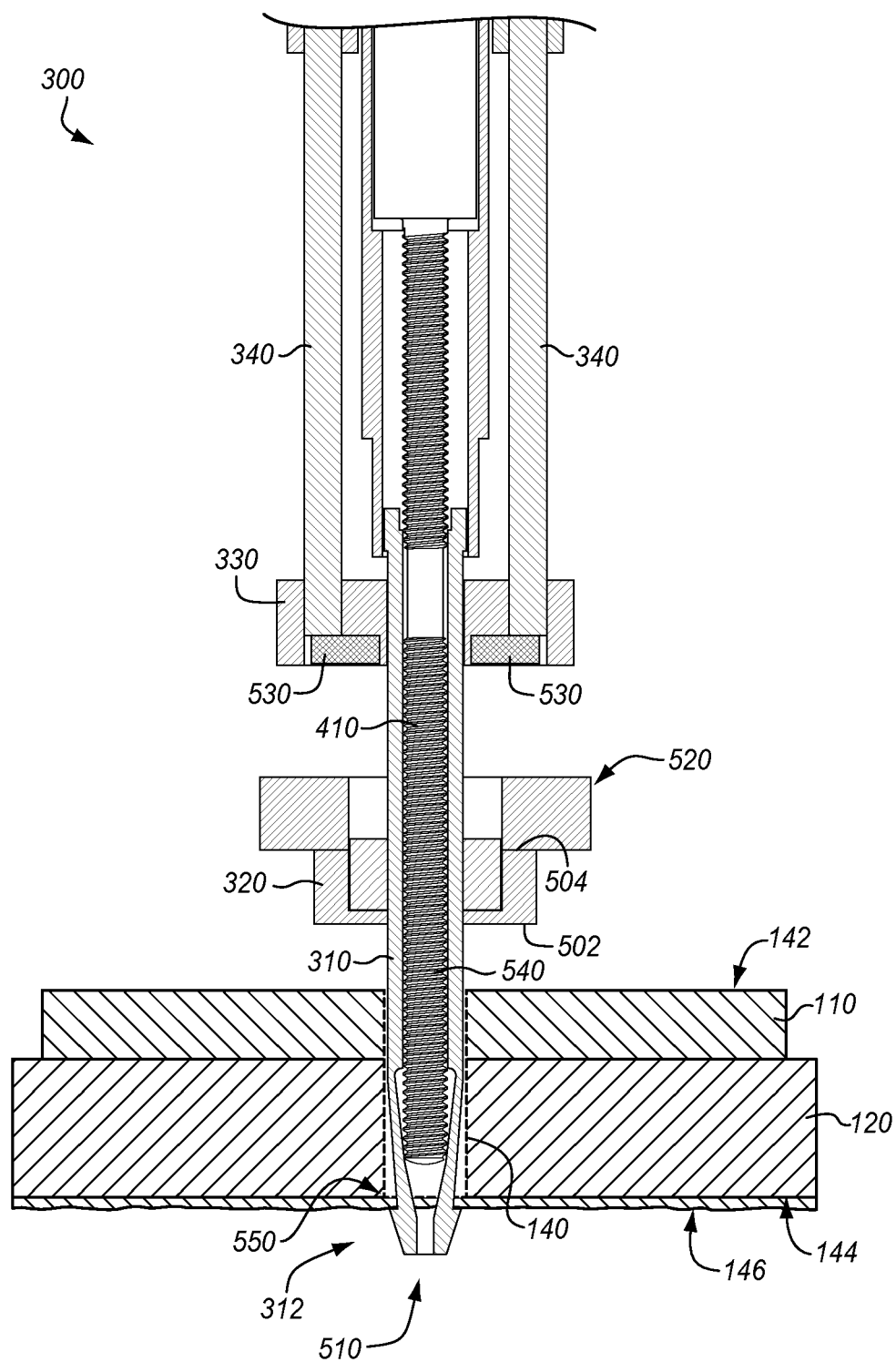
FIG. 5 is a cross-sectional side view of a gauge tool engaged with a hole of a structure in an illustrative embodiment.

FIG. 5 is a cross-sectional side view of the gauge tool 300 engaged with the hole 140 of the structure 100 in an illustrative embodiment. As shown in FIG. 3, the nose piece 310 is configured to slidably extend from a front side 502 of the base plate 320. The front side 502 of the base plate 320 includes a face sized to engage (e.g., adjoin or rest against) the front surface 142 of the structure 100 over the hole 140. Additionally, the nose piece 310 includes a first end 510 with the expandable tip 312 sized to insert into the hole 140 beyond the back surface 144 of the structure 100.

The nose piece 310 further includes a second end 520 that is disposed behind a back side 504 of the base plate 320. The second end 520 (e.g., base end) of the nose piece 310 is configured to mechanically couple with the transfer block 330 at or behind the back side 504 so that retraction of the nose piece 310 into the base plate 320 translates the transfer block 330 and the transfer rods 340 a corresponding distance into the measurement device 350. In one embodiment, the second end 520 of the nose piece 310 and the transfer block 330 couple via magnets 530. The magnets 530 may be disposed in the transfer block 330 and/or the second end 520 at or near the interface therebetween to link the motion of the components.

As further shown in FIG. 5, the threaded rod 410 is configured to rotate in a hollow axis 540 (e.g., threaded axis to mate with the threaded rod 410) of the nose piece 310 to pull the nose piece 310 into the base plate 320 and translate the slidable member (e.g., the transfer block 330 and/or the transfer rods 340). Since the back surface 144 of the hole 140 includes the uneven surface 146, a rotational torque of the threaded rod 410 compresses the uneven surface 146 for a compression distance 550 with the expandable tip 312. The measurement device 350 is thus configured to detect the distance that the slidable member translates as a result of rotating the threaded rod 410. The translated distance including the compression distance 550 of the expandable tip 312 into the uneven surface 146. Accordingly, the gauge tool 300 is configured to precisely determine the correct fastener length for the hole 140 regardless as to any variation of thickness on the blind slide of the hole as a result of epoxy applied to the back surface 144.

FIG. 6 is a flow chart illustrating a method 600 of determining a fastener length for a hole extending between a front surface and back surface of a structure in an illustrative embodiment. The steps of method 600 will be described with reference to FIGS. 1-5, but those skilled in the art will appreciate that method 600 may be performed with other structures, fasteners, joints, etc. The steps of this flow chart are not all inclusive and may include other steps not shown, and the steps may be performed in an alternative order. Assume, for this embodiment, that the method 600 includes providing a gauge tool as described previously with respect to FIGS. 2-5.

In step 602, the nose piece 310 is inserted into the hole 140. In step 604, the threaded rod 410 is rotated in the hollow axis 540 of the nose piece 310 to retract the nose piece 310 into the base plate 320 and radially expand the expandable tip 312 to contact the back surface 144 of the structure 100 and compress the back surface 144 for the compression distance 550. In step 606, the fastener length for the hole 140 is determined based at least in part on the compression distance 550. In one embodiment, the fastener length for the hole 140 is determined based on the retraction distance 414 of the nose piece 310 including the compression distance 550 of the expandable tip into the back surface of the structure. The retraction distance 414 of the nose piece 310 may be detected by measuring a sliding distance of a mechanical member (e.g., one of the transfer rods 340) through the measurement device 350, the mechanical member being mechanically linked with the nose piece 310. Further, the measurement device 350 may display the retraction distance 414 of the nose piece 310 including the compression distance 550 of the expandable tip 312 into the back surface 144 of the structure 100 for determining the fastener length for the hole 140.

Although specific embodiments were described herein, the scope is not limited to those specific embodiments. Rather, the scope is defined by the following claims and any equivalents thereof.

What is claimed is:

1. A gauge tool comprising:
   a base plate having a front side and a back side;
   a nose piece including a hollow cylindrical member extending through the base plate from a connected end to a distal end, the connected end coupled with a slidable member at the back side of the base plate, the distal end protruding a first distance from the base plate at the front side of the base plate and including an expandable tip, the expandable tip configured to radially expand to circumferentially contact a back rim of a hole, the nose piece configured to slide with respect to the base plate to retract into the base plate until the distal end is disposed a second distance from the base plate due to the expandable tip pressing the back rim of the hole; and
   a measurement device configured to detect a translating distance of the slidable member moving with retraction of the nose piece from the first distance to the second distance, and to display the translating distance for determining a fastener length for the hole.

2. The gauge tool of claim 1 wherein:
   the back rim of the hole includes an uneven epoxy surface, the gauge tool further includes a threaded rod configured to rotate in the hollow cylindrical member of the nose piece via a rotational tool configured with a predetermined torque to apply a corresponding force into the uneven epoxy surface with the expandable tip compress the uneven epoxy surface for a compression distance, and the translating distance of the slidable member detected by the measurement device includes a compression distance of the expandable tip into the uneven epoxy surface.

3. The gauge tool of claim 2 wherein:
the hollow cylindrical member includes an inner threaded wall to retract the nose piece with rotation of the threaded rod and expand the expandable tip.

4. The gauge tool of claim 2 further comprising:
a drive that forms a non-circular indentation to receive a rotational tool, and to transfer rotation of the rotational tool to the threaded rod.

5. The gauge tool of claim 4 wherein:
the rotational tool is configured with a torque setting that applies a corresponding prescribed force on the back rim of the hole with the distal end of the nose piece.

6. The gauge tool of claim 1 wherein:
the measurement device is configured to display a fastener grip length determined for the hole based on the translating distance of the slidable member.

7. The gauge tool of claim 1 wherein:
the hole is a blind side hole with limited access to the back rim; and
the fastener length is a grip length of a blind bolt to be installed to the hole.

8. A method of determining a fastener length for a hole extending between a front surface and back surface of a structure, the method comprising:
providing a gauge tool including a base plate and a nose piece slidable with respect to a base plate;
inserting the nose piece of the gauge tool into the hole, the nose piece including an expandable tip disposed beyond the back surface of the structure;
rotating a threaded rod in a hollow axis of the nose piece to retract the nose piece into the base plate and radially expand the expandable tip to contact the back surface of the structure and compress the back surface for a compression distance; and
determining the fastener length for the hole based at least in part on the compression distance.

9. The method of claim 8 further comprising:
determining the fastener length for the hole based on a distance of retraction of the nose piece including the compression distance of the expandable tip into the back surface of the structure.

10. The method of claim 9 further comprising:
detecting the distance of retraction of the nose piece by measuring a sliding distance of a mechanical member through a measurement device, the mechanical member being mechanically linked with the nose piece.

11. The method of claim 8 further comprising:
displaying a distance of retraction of the nose piece including the compression distance of the expandable tip into the back surface of the structure for determining the fastener length for the hole.

12. The method of claim 8 further comprising:
rotating the threaded rod in the hollow axis of the nose piece via a rotational tool to pull the nose piece into the base plate, translate a slidable member mechanically linked with the nose piece, and compress an uneven epoxy applied to the back surface for the compression distance, wherein the rotational tool is configured with a predetermined torque that applies a corresponding prescribed force on the back surface of the structure with the expandable tip.

13. The method of claim 8 wherein:
the hole is a blind side hole with limited access to the back surface of the structure; and
the fastener length is a grip length of a blind bolt to be installed to the hole.

14. A gauge tool for determining a fastener length for a hole extending between a front surface and back surface of a structure, the gauge tool comprising:
a base plate having a front side to engage the front surface of the structure over the hole;
a nose piece extending from the front side of the base plate, the nose piece slidable with respect to the base plate and including: a first end with an expandable tip sized to insert into the hole beyond the back surface of the structure, a second end that is mechanically coupled with a slidable member disposed at a back side of the base plate, and a hollow axis along a length of the nose piece;
a threaded rod to rotate in the hollow axis of the nose piece to retract the nose piece into the base plate and expand the expandable tip to contact the back surface of the structure and compress the back surface for a compression distance, wherein retraction of the nose piece translates the slidable member for a distance that includes the compression distance; and
a measurement device configured to detect the distance that the slidable member translates as a result of rotating the threaded rod for determining the fastener length for the hole.

15. The gauge tool of claim 14 wherein:
the back surface of the hole includes an uneven epoxy surface, and
wherein a torque of the threaded rod compresses the uneven epoxy surface for the compression distance with a corresponding force applied via the expandable tip.

16. The gauge tool of claim 15 further comprising:
the slidable member includes one or more mechanical members coupled with the nose piece that each translate for the distance that includes the compression distance of the uneven epoxy surface.

17. The gauge tool of claim 14 further comprising:
a drive that forms a non-circular indentation to receive a rotational tool, and to transfer rotation of the rotational tool to the threaded rod.

18. The gauge tool of claim 17 wherein:
the rotational tool is configured with a torque setting that applies a corresponding prescribed force on the back surface of the structure.

19. The gauge tool of claim 14 wherein:
the measurement device includes a display to indicate the distance to an operator of the gauge tool.

20. The gauge tool of claim 14 wherein:
the hole is a blind side hole with limited access to the back surface of the structure; and
the fastener length is a grip length of a blind bolt to be installed to the hole.

* * * * *